(12) United States Patent
Chiu

(10) Patent No.: US 9,638,161 B2
(45) Date of Patent: May 2, 2017

(54) ENERGY CONCENTRATION DEVICE

(71) Applicant: Lin-Tu Chiu, Douliu (TW)

(72) Inventor: Lin-Tu Chiu, Douliu (TW)

( * ) Notice: Subject to any disclaimer, the term of this patent is extended or adjusted under 35 U.S.C. 154(b) by 158 days.

(21) Appl. No.: 14/670,396

(22) Filed: Mar. 26, 2015

(65) Prior Publication Data

US 2016/0281675 A1 Sep. 29, 2016

(51) Int. Cl.
*F03B 13/24* (2006.01)

(52) U.S. Cl.
CPC .............. *F03B 13/24* (2013.01); *Y02B 10/50* (2013.01); *Y02E 10/38* (2013.01)

(58) Field of Classification Search
USPC ............................................ 290/53; 417/331
See application file for complete search history.

(56) References Cited

U.S. PATENT DOCUMENTS

| | | | | |
|---|---|---|---|---|
| 5,011,142 | A * | 4/1991 | Eckler | A63B 21/0087 482/113 |
| 5,416,947 | A * | 5/1995 | Jaffe | B08B 9/0326 15/330 |
| 6,949,840 | B2 * | 9/2005 | Ricketts | F03G 7/08 290/1 A |
| 8,604,631 | B2 * | 12/2013 | Rohrer | F03B 13/1815 290/42 |
| 2010/0102562 | A1 * | 4/2010 | Greenspan | F03B 13/1865 290/53 |
| 2012/0025532 | A1 * | 2/2012 | Song | F03B 13/1805 290/53 |
| 2014/0152014 | A1 * | 6/2014 | Fait | F03B 13/20 290/53 |
| 2014/0159380 | A1 * | 6/2014 | Schlemmer | F03D 9/001 290/1 R |
| 2014/0217737 | A1 * | 8/2014 | Egana Castillo | F03B 13/10 290/53 |
| 2016/0186715 | A1 * | 6/2016 | Fait | F03B 13/20 290/53 |

OTHER PUBLICATIONS

Aurélien Babarita, Michel Guglielmib, Alain Clémenta, "Declutching control of a wave energy converter" Sep. 2009, Ocean Engineering vol. 36, Issues 12-13, pp. 1015-1024.*

(Continued)

*Primary Examiner* — Tulsidas C Patel
*Assistant Examiner* — Charles Reid, Jr.
(74) *Attorney, Agent, or Firm* — Leong C. Lei

(57) ABSTRACT

An energy concentration device includes a pneumatic cylinder that allows for contact with waving sea water of the nature to make a float device to drive a piston rod to achieve an effect of up and down piston movement so as to realize an effect of pressurization of air inside the pneumatic cylinder, whereby the air may achieve an effect of increase of pressurization level through multi-staged pressurization and an effect of accumulation by being stored in a high-pressure air storage device for the purposes of electrical power generation with the pressurized air and supplying pneumatic power required by other applications, such as automobiles, motorcycles, buses, and factories and also for supplying of pneumatic power to household devices, such as household appliances and pneumatically-operating doors.

8 Claims, 10 Drawing Sheets

(56) References Cited

OTHER PUBLICATIONS

David Forehand, Aristides Kiprakis, Anup Nambiar, and A. Wallace, "A Fully Coupled Wave-to-Wire Model of an Array of Wave Energy Converters" Sep. 2015, IEEE Transactions on Sustainable Energy 7(1):1-11.*

Limin Yang and Torgeir Moan, "Cylinder Bore Wear Damage Analysis of a Heaving-Buoy Wave Energy Converter With Hydraulic Power Take-Off" Jan. 2010, ASME 2010 29th International Conference on Ocean, Offshore and Arctic Engineering.*

* cited by examiner

ENERGY CONCENTRATION DEVICE

TECHNICAL FIELD OF THE INVENTION

The present invention relates generally to an energy concentration device, and more particularly to an energy concentration device that comprises a pneumatic cylinder that allows for contact with waving sea water of the nature to make a float device to drive a piston rod to achieve an effect of up and down piston movement so as to realize an effect of pressurization of air inside the pneumatic cylinder, whereby the air may achieve an effect of increase of pressurization level through multi-staged pressurization and an effect of accumulation by being stored in a high-pressure air storage device for the purposes of electrical power generation with the pressurized air and supplying pneumatic power required by other applications, such as automobiles, motorcycles, buses, and factories and also for supplying of pneumatic power to household devices, such as household appliances and pneumatically-operating doors.

DESCRIPTION OF THE PRIOR ART

People have been aware of the use of hydraulic power and wind power since far ancient times and such powers are referred to as "old ways of renewable energy". Since 1970, after the oil crisis, the use and development of new sources of energy (nuclear energy, wind energy, solar energy, and biomass energy) have been significantly progressed, leading human beings into a new milestone. With the creation of steam engines by Watt in 1759, human beings enter the steam age. Machines driven by coal brought a new way of energy that lead human civilization into the industrial age, where mass production brought wealth and comfortable living, but also caused a non-returning way of fate for the use of fossil energy caused various pollutions and global warming. In addition, the fossil energy is limited and lots of mining areas have already been or are going to be exhausted. On the other hand, renewable energies are generally unlimited. Although uranium based nuclear power generation is not considered belonging to fossil energy, yet the reserves of uranium is still limited. Thus, the fission based nuclear power is not considered a renewable energy. The importance and likelihood of nuclear power as being considered a renewable energy can only be emphasized after new breakthrough of the fusion based nuclear power occurs.

Before the 19th century when the use of coal has been greatly advanced, all sorts of energy used are renewable energies and the general sources are human labor and animal power, and cattle, mules, horses, hydraulic milling and wind milling, and wood fires are commonly used. Fossil oil and natural gas did not gained their importance until 1900, and wind power and solar energy became important in 2010. Further, except unclear energy, tidal energy, and geothermal energy, the basic supply of energy for human activities is generally obtained from sunlight. Other energies, such as wind power, hydraulic power, and ocean flows, are also the result of sunlight heating air and water of the Earth.

The advance of modern society makes consumption of electrical power by human beings increased so that the conventional way of power generation no longer suffices to meet the need of the general consumers and may suffer continuous rise of power generation cost. Consequently, power generation has changed from the traditional way to new ways that are based on renewable energy sources. Power generation with renewable energy sources includes hydraulic energy, solar energy, geothermal energy, ocean energy, and wind power, among which ocean energy includes tidal energy, wave energy, and ocean flow energy. The electrical energy generated with these renewable energy based electrical power generation can be stored for subsequent use or may be directly used after generation.

A common way of storing or accumulating the electrical power generated with renewable energies is to stored the electrical power in a power storage device, such as a rechargeable battery, to achieve the purpose of collection and storage of electrical power. Although the rechargeable battery may receive and store the electrical energy generated with the renewable energies up a maximum level of 100%, yet the rechargeable battery, after being stored for a period of time, may readily discharge the electrical power so that when a user later attempts to use the electrical power stored in the rechargeable battery, there is only about 70%-80% of the total electrical power left in the battery. This is a natural way of energy loss and all the electrical power may eventually get totally lost with the lapse of time, leading to an unexpected consequence that the rechargeable battery is powerful enough to supply electrical power as scheduled to an electronic or electrical device when a user attempts to provide electrical power to the electronic or electrical device. Under such a condition, an additional or spare rechargeable battery may be needed for backup purposes in order to achieve expected supply of electrical to the electronic or electrical device.

Thus, the present invention aims to provide a solution to overcome or alleviate the above-discussed issues and problems.

SUMMARY OF THE INVENTION

In view of the problem of electrical leakage or natural loss of electrical power stored in a power storage device that accumulates and stores therein electrical power generated with renewable energy sources so that the stored electrical power may get exhausted with time and eventually leading to a situation that the rechargeable battery is incapable of supplying electrical power as scheduled to an electronic or electrical device when a user attempts to provide electrical power from the rechargeable battery to the electronic or electrical device, an object of the present invention is to provide an energy concentration device, which comprises a pneumatic cylinder that is driven by waving sea water of the nature by having a float device drive a piston rod to achieve an effect of up and down piston movement, so as to realize an effect of pressurization of air inside the pneumatic cylinder, whereby the air may achieve an effect of increase of pressurization level through multi-staged pressurization and an effect of accumulation by being stored in a high-pressure air storage device. The high-pressure air storage device may provide loss-free permanent storage in a way of being ready for timely use for the purposes of electrical power generation with the pressurized air and supplying pneumatic power required by other applications, such as automobiles, motorcycles, buses, and factories and also for supplying of pneumatic power to household devices, such as household appliances and pneumatically-operating doors.

To achieve the above object, the present invention provides an energy concentration device, which uses natural power as power for pressurizing air so as to achieve an effect of air compression and thus achieving concentrated storage of pressurized air energy, which comprises:

a plurality of pneumatic cylinders, wherein each of the pneumatic cylinders comprises a top and a bottom and each of the pneumatic cylinders comprises a first end and a second end; the first end of each of the top and the bottom of each of the pneumatic cylinders is provided with a first one-way valve and the second end of each of the top and the bottom of each of the pneumatic cylinders is provided with a second one-way valve; each of the pneumatic cylinders is provided therein with a piston device and the piston device comprises a piston head and a piston rod where an end of the piston rod connected to the piston head; the piston head is at a middle of the pneumatic cylinder in an initial condition and an opposite end of the piston head is provided with a float device; each float device has four corners each of which is provided with a through hole; each of the pneumatic cylinders is provided with an air inlet tube and an air outlet tube; the first one-way valves of the top and the bottom of each of the pneumatic cylinders are connected to the air inlet tube and each of the air inlet tubes is connected to an external air pumping device; the second one-way valves of the top and the bottom of each of the pneumatic cylinders are connected to the air outlet tube; each of the pneumatic cylinders is provided externally with a protection enclosure and the protection enclosure is provided in each of four internal corners thereof with a support post, wherein each of the support posts is received through each of the through holes of the float device;

a plurality of pressurization barrels, wherein each of the pressurization barrels comprises a first end and a second end and the first end of each of the pressurization barrels is provided with a first one-way valve and the second end of each of the pressurization barrels is provided with a second one-way valve; an end of each of the pressurization barrels is provided with a pressure indicator gauge; the first one-way valve of each of the pressurization barrels is connected to the air outlet tube of the second end of each of the pneumatic cylinders and the second one-way valve of each of the pressurization barrels is connected to the air inlet tube of the first end of each of the pneumatic cylinders;

a high-pressure air storage device, wherein an end of the high-pressure air storage device is provided with at least one first one-way valve and an opposite end of the high-pressure air storage device is provided with a plurality of second one-way valves; the first one-way valve of the high-pressure air storage device is connected via a transmission tube to the second one-way valve of the endmost one of the pressurization barrels; each of the second one-way valves of the high-pressure air storage device is provided with the external transmission tube and the external transmission tube is connectable with an external pneumatic power device; the high-pressure air storage device comprises a pressure indicator gauge and a control device and the control device is operable to control opening/closing of each of the second one-way valves;

wherein each of the pneumatic cylinders and each of the pressurization barrels are grouped together as a pressurization system; the pressurization systems are connected in a horizontal direction to each other in a serial connection manner; each of the pneumatic cylinders is provided with a protection enclosure and the protection enclosure is provided in each of four internal corners thereof with a support post with each of the support posts coupled to an inner top end of the protection enclosure; and wherein the float device is contactable with waving sea water of the nature to cause the float device to drive the piston rod to achieve up-and-down piston movement.

The present invention provides an energy concentration device, which comprises a pneumatic cylinder that allows for contact with waving sea water of the nature to make a float device to drive a piston rod to achieve an effect of up and down piston movement so as to realize an effect of pressurization of air inside the pneumatic cylinder, whereby the air may achieve an effect of increase of pressurization level through multi-staged pressurization and an effect of accumulation by being stored in a high-pressure air storage device. The high-pressure air storage device may provide loss-free permanent storage in a way of being ready for timely use for the purposes of electrical power generation with the pressurized air and supplying pneumatic power required by other applications, such as automobiles, motorcycles, buses, and factories and also for supplying of pneumatic power to household devices, such as household appliances and pneumatically-operating doors.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
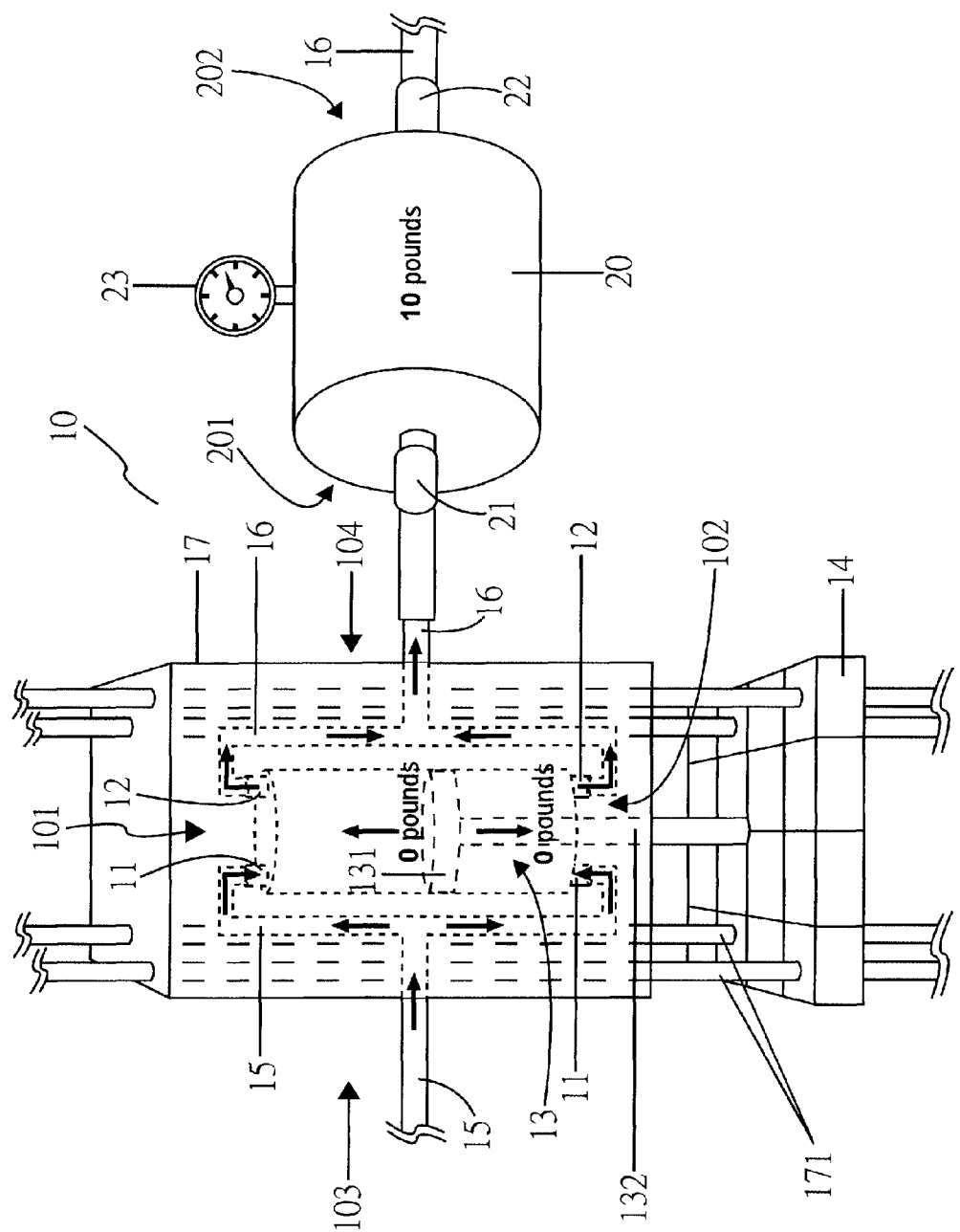
FIG. 1 is a schematic view showing pressurization of air according to a first embodiment of the present invention.
Figure 3:
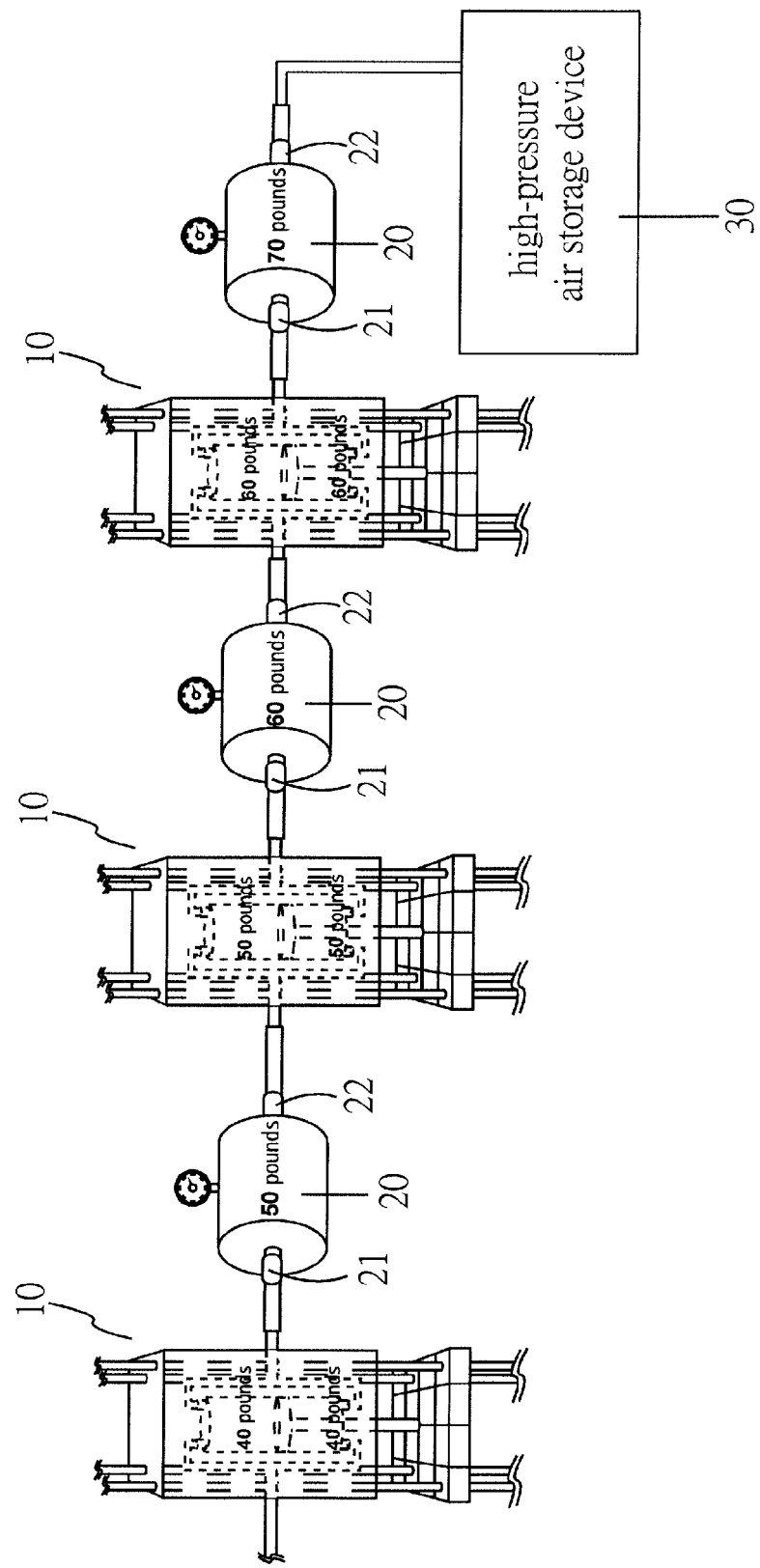
FIG. 3 is a schematic view showing transfer of pressurized air to a high-pressure air storage device through serial connection of pneumatic cylinders and pressurization barrels according to the first embodiment of the present invention.

Referring to FIGS. 1 and 3, which illustrate a first embodiment of the present invention, the present invention provides an energy concentration device, which uses natural power as power for pressurizing air so as to achieve an effect of air compression and thus achieving concentrated storage of pressurized air energy, which comprises:

a plurality of pneumatic cylinders 10, wherein each of the pneumatic cylinders 10 comprises a top 101 and a bottom 102 and each of the pneumatic cylinders 10 comprises a first end 103 and a second end 104; the first end 103 of each of the top 101 and the bottom 102 of each of the pneumatic cylinders 10 is provided with a first one-way valve 11 and the second end 104 of each of the top 101 and the bottom 102 of each of the pneumatic cylinders 10 is provided with a second one-way valve 12; each of the pneumatic cylinders 10 is provided therein with a piston device 13 and the piston device 13 comprises a piston head 131 and a piston rod 132 where an end of the piston rod 132 connected to the piston head 131; the piston head 131 is at a middle of the pneumatic cylinder 10 in an initial condition and an opposite end of the piston head 131 is provided with a float device 14; each float device 14 has four corners each of which is provided with a through hole; each of the pneumatic cylinders 10 is provided with an air inlet tube 15 and an air outlet tube 16; the first one-way valves 11 of the top 101 and the bottom 102 of each of the pneumatic cylinders 10 are connected to the air inlet tube 15 and each of the air inlet tubes 15 is connected to an external air pumping device; the second one-way valves 12 of the top 101 and the bottom 102 of each of the pneumatic cylinders 10 are connected to the air outlet tube 16; each of the pneumatic cylinders 10 is provided externally with a protection enclosure 17 and the protection enclosure 17 is provided in each of four internal corners thereof with a support post 171, wherein each of the support posts 171 is received through each of the through holes of the float device 14;

a plurality of pressurization barrels 20, wherein each of the pressurization barrels 20 comprises a first end 201 and a second end 202 and the first end 201 of each of the pressurization barrels 20 is provided with a first one-way valve 21 and the second end 202 of each of the pressurization barrels 20 is provided with a second one-way valve 22; an end of each of the pressurization barrels 20 is provided with a pressure indicator gauge 23; the first one-way valve 21 of each of the pressurization barrels 20 is connected to the air outlet tube of the second end 104 of each of the pneumatic cylinders 10 and the second one-way valve 22 of each of the pressurization barrels 20 is connected to the air inlet tube 15 of the first end 103 of each of the pneumatic cylinders 10;

a high-pressure air storage device 30, wherein an end of the high-pressure air storage device 30 is provided with at least one first one-way valve 301 and an opposite end of the high-pressure air storage device 30 is provided with a plurality of second one-way valves 302; the first one-way valve 301 of the high-pressure air storage device 30 is connected via a transmission tube to the second one-way valve 22 of the endmost one of the pressurization barrels 20; each of the second one-way valves 302 of the high-pressure air storage device 30 is provided with the external transmission tube and the external transmission tube is connectable with an external pneumatic power device 50; the high-pressure air storage device 30 comprises a pressure indicator gauge 31 and a control device 32 and the control device 32 is operable to control opening/closing of each of the second one-way valves 302;

wherein each of the pneumatic cylinders 10 and each of the pressurization barrels 20 are grouped together as a pressurization system 90; the pressurization systems 90 are connected in a horizontal direction to each other in a serial connection manner; each of the pneumatic cylinders 10 is provided with a protection enclosure 17 and the protection enclosure 17 is provided in each of four internal corners thereof with a support post 171 with each of the support posts 171 coupled to an inner top end of the protection enclosure 17; and wherein the float device 14 is contactable with waving sea water of the nature to cause the float device 14 to drive the piston rod 132 to achieve up-and-down piston movement.

The first one-way valves 11, 21, 301 are ingress-allowed egress-prohibited one-way check valves.

The second one-way valves 12, 22, 302 are egress-allowed ingress-prohibited one-way check valves.

Figure 2:
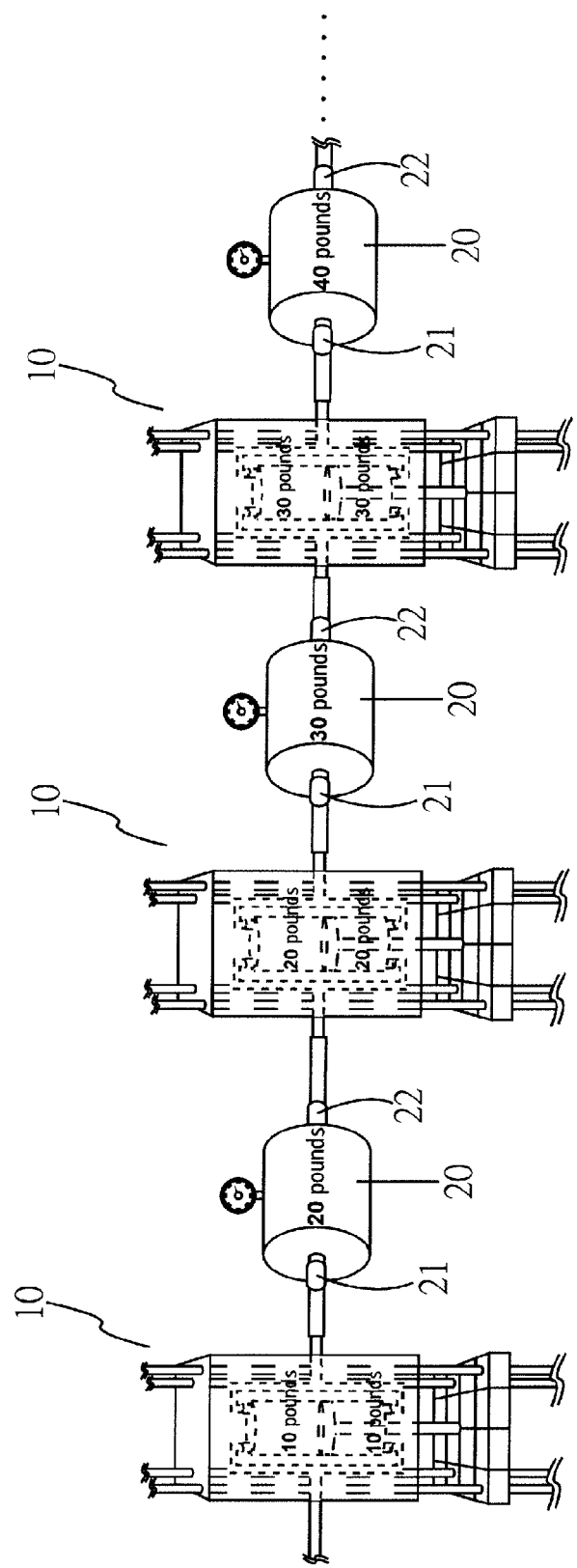
FIG. 2 is a schematic view showing pressurization of air through serial connection of pneumatic cylinders and pressurization barrels according to the first embodiment of the present invention.
Figure 4:
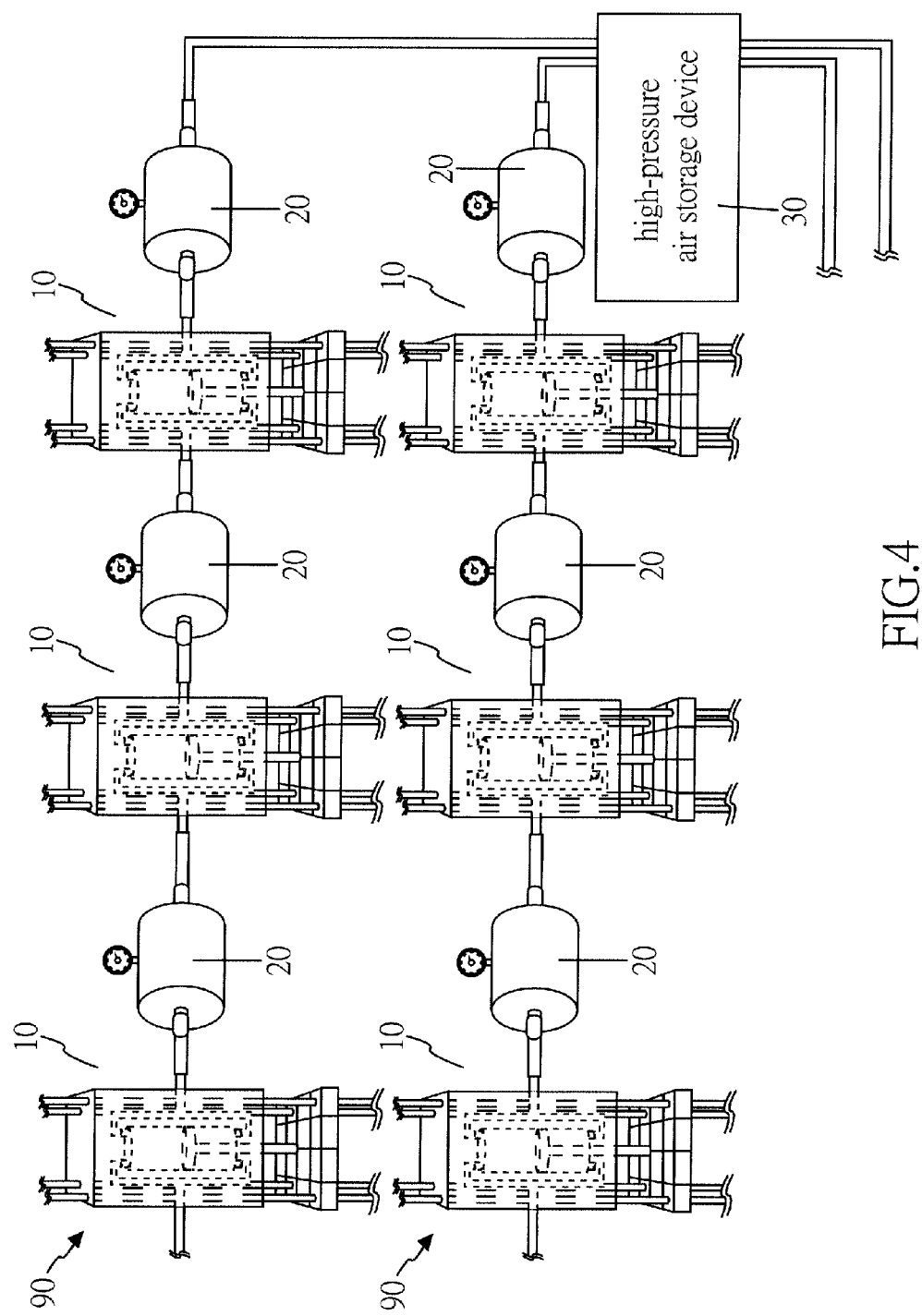
FIG. 4 is a schematic view showing two groups of serial connection based energy concentration devices individually transferring pressurized air to a high-pressure air storage device according to a second embodiment of the present invention.

Referring to FIGS. 2 and 3, each of the pneumatic cylinders 10 and each of the pressurization barrels 20 are grouped together as a pressurization system 90. The pressurization systems 90 are connected in a horizontal direction to each other in a serial connection manner. Thus, in an initial condition, the piston device 13 of the front-most one of the pneumatic cylinders 10 receives a supply of external air through the air inlet tube 15 so that the interior of the piston device 13 is full or air thereby providing the interior of the piston device 13 with a predetermined air pressure. For example, considering the interior air pressure of the front-most one of the pneumatic cylinders 10 is 0 pound, with the piston device 13 comprising therein the piston rod 132 and an opposite end of the piston rod 132 provided with the float device 14, when the present invention is placed on a sea surface or at a seashore, the float device 14 is driven by sea water that waves and thus contacts the float device 14 in such a way that the float device 14 is forced to reciprocally move up and down by the waving of the sea water. As such, the float device 14 drives the piston rod 132 to perform up and down piston movement within the piston device 13 and at the same time, air in the interior of the piston device 13 is subjected to an effect of up and down air pressurization, whereby the pressurized air is conducted through the air outlet tube 16 to an interior of the pressurization barrel 20. Further, with the top 101 and the bottom 102 of the piston device 13 and the air inlet tube 15 and the air outlet tube 16 being respectively provided therebetween with the first one-way valves 11 and the second one-way valves 12 and the first end 201 and the second end 202 of the pressurization barrel 20 being respectively provided with the first one-way valve 21 and the second one-way valve 22 and the first one-way valves 11, 21 and the second one-way valves 12, 22 being ingress-allowed, egress-prohibited valves and egress-allowed, ingress-prohibited valves, when air flows through the first one-way valves 11, 21 and the second one-way valves 12, 22, no reverse flow may occur and the pressurized air can be reliably preserved in the pressurization barrel 20. And, with air being pressurized by the up and down piston movement of the piston rod 132 of the piston device 13, the air pressure of the interior of the pressurization barrel 20 may be raised through the pressurization to 10 pounds. Thus, when the air pressure inside the pressurization barrels 20 reaches 10 pounds, the air having an air pressure of 10 pounds can be conveyed to a rearward one of the pneumatic cylinders 10 to be further compressed by the piston device 13 to reach an air pressure of 20 pounds inside the rearward pressurization barrel 20, and so on, whereby through the piston movement achieved with the piston device 13 of the next rearward one of the pneumatic cylinders 10 to pressurize air, an air pressure that is desired by a user may be reached and the so pressurized air can be stored in the high-pressure air storage device 30 for subsequent use by the pneumatic power device 50 to generate electrical power that is then supplied to all sorts of household appliances and transportations that need electrical power. On the other hand, referring to FIG. 4, a second embodiment of the present invention is shown, in which according to different needs of users, two groups of serial-connection based pressurization systems 90 can be provided, where each group of the pressurization system 90 can feed pressurized air into the high-pressure air storage device 30 and the number of the high-pressure air storage device 30 may be more than one to suit the need of a predetermined level of pressure.

Figure 5:
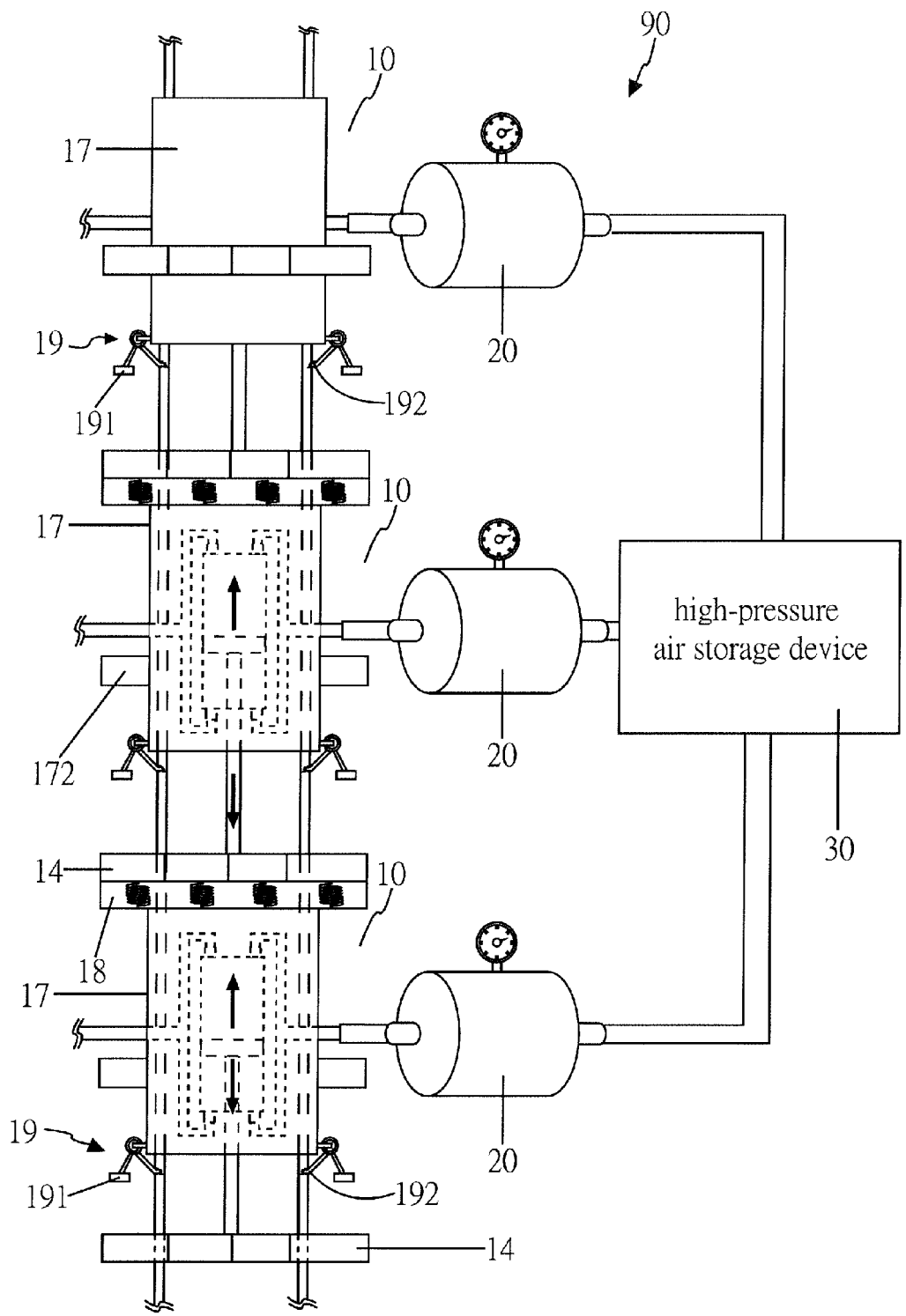
FIG. 5 is a schematic view showing vertical stacking of pneumatic cylinders and pressurization barrels according to a third embodiment of the present invention.

Referring to FIG. 5, a third embodiment of the present invention is shown. The present invention provides an energy concentration device, which uses natural power as power for pressurizing air so as to achieve an effect of air compression and thus achieving concentrated storage of pressurized air energy, which comprises:

a plurality of pneumatic cylinders 10, wherein each of the pneumatic cylinders 10 comprises a top 101 and a bottom 102 and each of the pneumatic cylinders 10 comprises a first end 103 and a second end 104; the first end 103 of each of the top 101 and the bottom 102 of each of the pneumatic cylinders 10 is provided with a first one-way valve 11 and the second end 104 of each of the top 101 and the bottom 102 of each of the pneumatic cylinders 10 is provided with a second one-way valve 12; each of the pneumatic cylinders 10 is provided therein with a piston device 13 and the piston device 13 comprises a piston head 131 and a piston rod 132 where an end of the piston rod 132 connected to the piston head 131; the piston head 131 is at a middle of the pneumatic cylinder 10 in an initial condition and an opposite end of the piston head 131 is provided with a float device 14; each float device 14 has four corners each of which is provided with a through hole; each of the pneumatic cylinders 10 is provided with the air inlet tube 15 and the air outlet tube 16; the first one-way valves 11 of the top 101 and the bottom 102 of each of the pneumatic cylinders 10 are connected to the air inlet tube 15 and each of the air inlet tubes 15 is connected to an external air pumping device; the second one-way valves 12 of the top 101 and the bottom 102 of each of the pneumatic cylinders 10 are connected to the air outlet tube 16; each of the pneumatic cylinders 10 is provided externally with a protection enclosure 17, the protection enclosure 17 is provided in each of four internal corners thereof with a support post 171, each of the support posts 171 is received through each of the through holes of the float device 14;

a plurality of pressurization barrels 20, wherein each of the pressurization barrels 20 comprises a first end 201 and a second end 202 and the first end 201 of each of the pressurization barrels 20 is provided with a first one-way valve 21 and the second end 202 of each of the pressurization barrels 20 is provided with a second one-way valve 22; an end of each of the pressurization barrels 20 is provided with a pressure indicator gauge 23; the first one-way valve 21 of each of the pressurization barrels 20 is connected to the air outlet tube of the second end 104 of each of the pneumatic cylinders 10 and the second one-way valve 22 of each of the pressurization barrels 20 is connected to the air inlet tube 15 of the first end 103 of each of the pneumatic cylinders 10;

a high-pressure air storage device 30, wherein an end of the high-pressure air storage device 30 is provided with at least one first one-way valve 301 and an opposite end of the high-pressure air storage device 30 is provided with a plurality of second one-way valves 302; the first one-way valve 301 of the high-pressure air storage device 30 is connected via a transmission tube to the second one-way valve 22 of the endmost one of the pressurization barrels 20; each of the second one-way valves 302 of the high-pressure air storage device 30 is provided with the external transmission tube and the external transmission tube is connectable with an external pneumatic power device 5; the high-pressure air storage device 30 comprises a pressure indicator gauge 31 and a control device 32 and the control device 32 is operable to control opening/closing of each of the second one-way valves 302;

wherein each of the pneumatic cylinders 10 and each of the pressurization barrels 20 are grouped together as a pressurization system 90 and each of the pressurization system 90 is coupled through vertical stacking on each other; each of the pneumatic cylinders 10 is provided with a protection enclosure 17 and the protection enclosure 17 is provided in each of four internal corners thereof with a support post 171 with each of the support posts 171 extending through an inner top end of the protection enclosure 17 so that the support posts 171 function as rails along which movements can be made;

wherein the float device 14 is contactable with waving sea water of the nature to cause the float device 14 to drive the piston rod 132 to achieve up-and-down piston movement.

Figure 6:
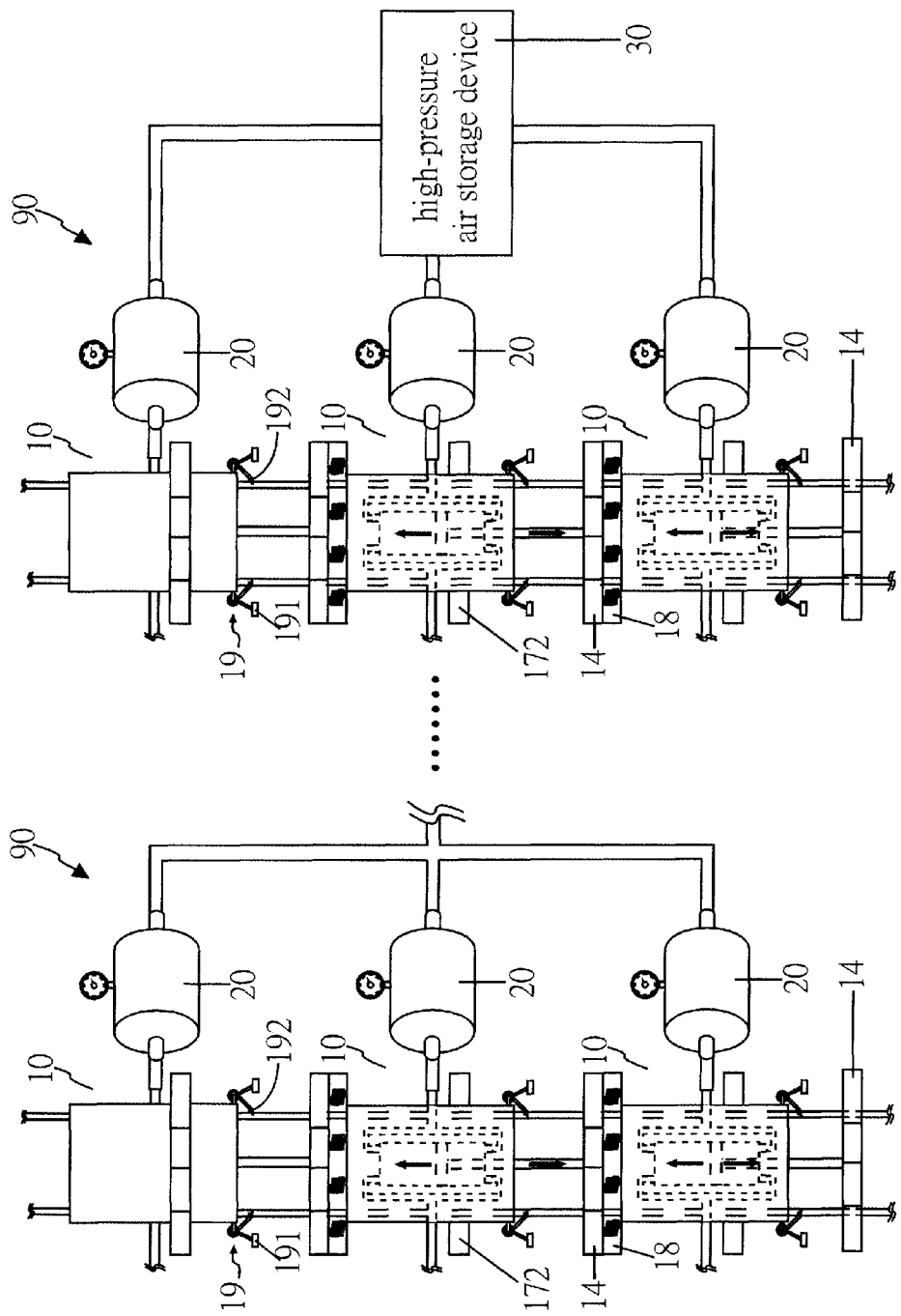
FIG. 6 is a schematic view showing two groups of stacked energy concentration devices according to a fourth embodiment of the present invention.

Referring to FIG. 5, the protection enclosure 17 of the present invention may be further provided with a coupling device 19; an end of the coupling device 19 is provided with a bearing portion 191 and an opposite end of the coupling device 19 is provided with an engagement element 192; the support post 171 is provided with a plurality of recesses and the recesses are engageable with the engagement element 192 in order to provides an effect of positioning, whereby with the coupling device 19 of the protection enclosure 17 comprising the bearing portion 191, when the lowermost one of the float devices 14 is hit by sea waves, the float device 14 is moved upward to get into contact with the bearing portion 191 of the coupling device 19 and with the bearing portion 191 being so contacted, the engagement element 192 disengages from the recesses of the support post 171 and under this condition, when the hitting force of the sea waves reaches a predetermined level, the bottommost one of the protection enclosures 17 moves upward along the support post 171 so as to cause a cushioning device 18 to contact the upper float device 14 and the bearing portion 191 of the coupling device 19 of the protection enclosure 17 thereof to achieve an effect of two-staged air pressurization and so on. If the hitting force of the sea waves is getting even more stronger, an effect that the coupling device 19 is operable to disengage from the protection enclosure 17 and subsequently moves an upper float device 172 to achieve further air pressurization so that the pressurized air is conveyed to and stored in the high-pressure air storage device 30. Oppositely, after pressurization is made with the upward force, gravity causes a downward force on the float device 14 to return the float device 14 back to the initial condition. Meanwhile, the engagement element 192 of the coupling device 19 re-engages the recesses of the support post 171. Thus, referring to FIG. 6, a fourth embodiment of the present invention is shown, in which according to different needs of users, two groups of stacked pressurization systems 90 can be provided, where each group of the pressurization system 90 can feed pressurized air into the high-pressure air storage device 30 and the number of the high-pressure air storage device 30 may be more than one to suit the need of a predetermined level of pressure.

Figure 7:
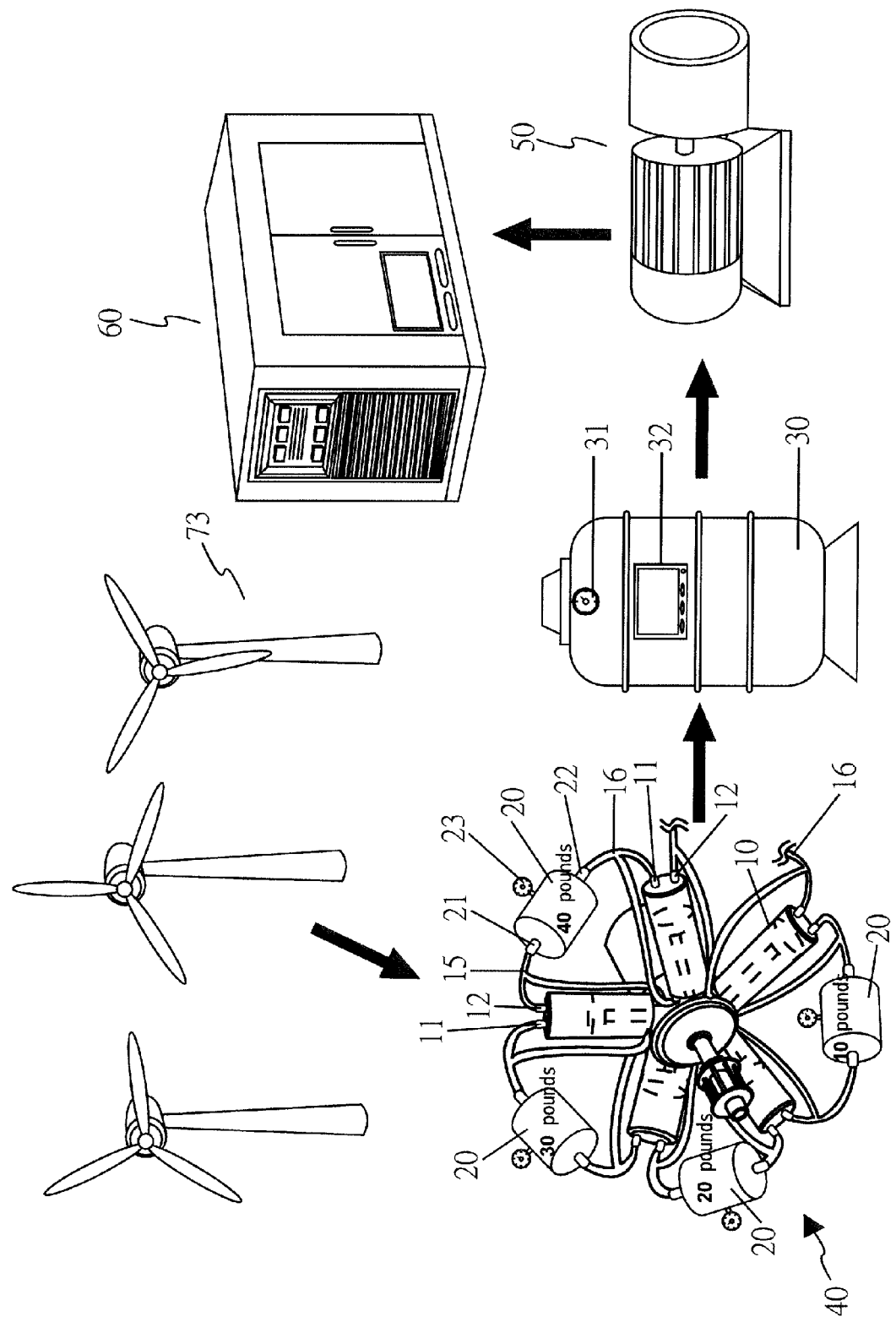
FIG. 7 is a schematic view showing wind power generation according to a fifth embodiment of the present invention.

Referring to FIG. 7, a fifth embodiment of the present invention is shown. The present invention provides an energy concentration device, which uses natural power as power for pressurizing air so as to achieve an effect of air compression and thus achieving concentrated storage of pressurized air energy, which comprises:

a crankcase 40, wherein the crankcase 40 is provided therein with a crank; the crank is provided, in a spaced manner, with a plurality of connection bars; the crankcase 40 is externally provided with a connection shaft; the connection shaft is coupled to other cranks of the crankcase 40;

a plurality of pneumatic cylinders 10, wherein each of the pneumatic cylinders 10 comprises a top 101 and a bottom 102 and each of the pneumatic cylinders 10 comprises a first end 103 and a second end 104; the first end 103 of each of the top 101 and the bottom 102 of each of the pneumatic cylinders 10 is provided with a first one-way valve 11 and the second end 104 of each of the top 101 and the bottom 102 of each of the pneumatic cylinders 10 is provided with a second one-way valve 12; each of the pneumatic cylinders 10 is provided therein with a piston device 13 and the piston device 13 comprises a piston head 131 and a piston rod 132 where an end of the piston rod 132 connected to the piston head 131; the piston head 131 is at a middle of the pneumatic cylinder 10 in an initial condition and an opposite end of the piston head 131 is connected to the connection bar of the crankcase 40; each of the pneumatic cylinders 10 is provided with the air inlet tube 15 and the air outlet tube 16; the first one-way valves 11 of the top 101 and the bottom 102 of each of the pneumatic cylinders 10 are connected to the air inlet tube 15 and each of the air inlet tubes 15 is connected to an external air pumping device; the second one-way valves 12 of the top 101 and the bottom 102 of each of the pneumatic cylinders 10 are connected to the air outlet tube 16;

a plurality of pressurization barrels 20, wherein each of the pressurization barrels 20 comprises a first end 201 and a second end 202 and the first end 201 of each of the pressurization barrels 20 is provided with a first one-way valve 21 and the second end 202 of each of the pressurization barrels 20 is provided with a second one-way valve 22; an end of each of the pressurization barrels 20 is provided with a pressure indicator gauge 23; the first one-way valve 21 of each of the pressurization barrels 20 is connected to the air outlet tube of the second end 104 of each of the pneumatic cylinders 10 and the second one-way valve 22 of each of the pressurization barrels 20 is connected to the air inlet tube 15 of the first end 103 of each of the pneumatic cylinders 10;

a high-pressure air storage device 30, wherein an end of the high-pressure air storage device 30 is provided with at least one first one-way valve 301 and an opposite end of the high-pressure air storage device 30 is provided with a plurality of second one-way valves 302; the first one-way valve 301 of the high-pressure air storage device 30 is connected via a transmission tube to the second one-way valve 22 of the endmost one of the pressurization barrels 20; each of the second one-way valves 302 of the high-pressure air storage device 30 is provided with the external transmission tube and the external transmission tube is connectable with an external pneumatic power device 50; the high-pressure air storage device 30 comprises a pressure indicator gauge 31 and a control device 32 and the control device 32 is operable to control opening/closing of each of the second one-way valves 302, whereby when a user attempt to generate electrical power, the external pneumatic power device 50 is connected to a dynamo device 60 to allow the external pneumatic power device 50 to supply pressurized air to the dynamo device 60 to achieve an effect of power generation to be supplied to all sorts of household appliances and transportations that need electrical power;

wherein each of the pneumatic cylinders 10 and each of the pressurization barrels 20 are grouped together as a pressurization system 90 and the pressurization systems 90 are connected to each other in a serial connection manner;

further, the connection shaft of the crankcase 40 is connectable with an external power device for power generation so as to couple to and drive a rotary device arranged in the external power device, whereby the connection shaft drives the crank of the crankcase 40 to rotate and the piston rod 132 of each of the pneumatic cylinders 10 is connected to the connection bar of the crank of the crankcase 40 so that the piston rod 132 can be driven by the connection bar of the crank to achieve an effect of up and down piston movement;

wherein the external power device is a wind power generation device 73; the wind power generation device 73 comprises blades and a transmission shaft; the wind power generation device 73 comprises a rotor and a dynamo; the rotor is coupled to the transmission shaft; whereby an external airflow, when contacting the blades, drives the transmission shaft to rotate so as to allow the rotor to drive the dynamo to generate electrical power whereby electricity supplied from the dynamo can be used to drive a rotary device to rotate.

Figure 9:
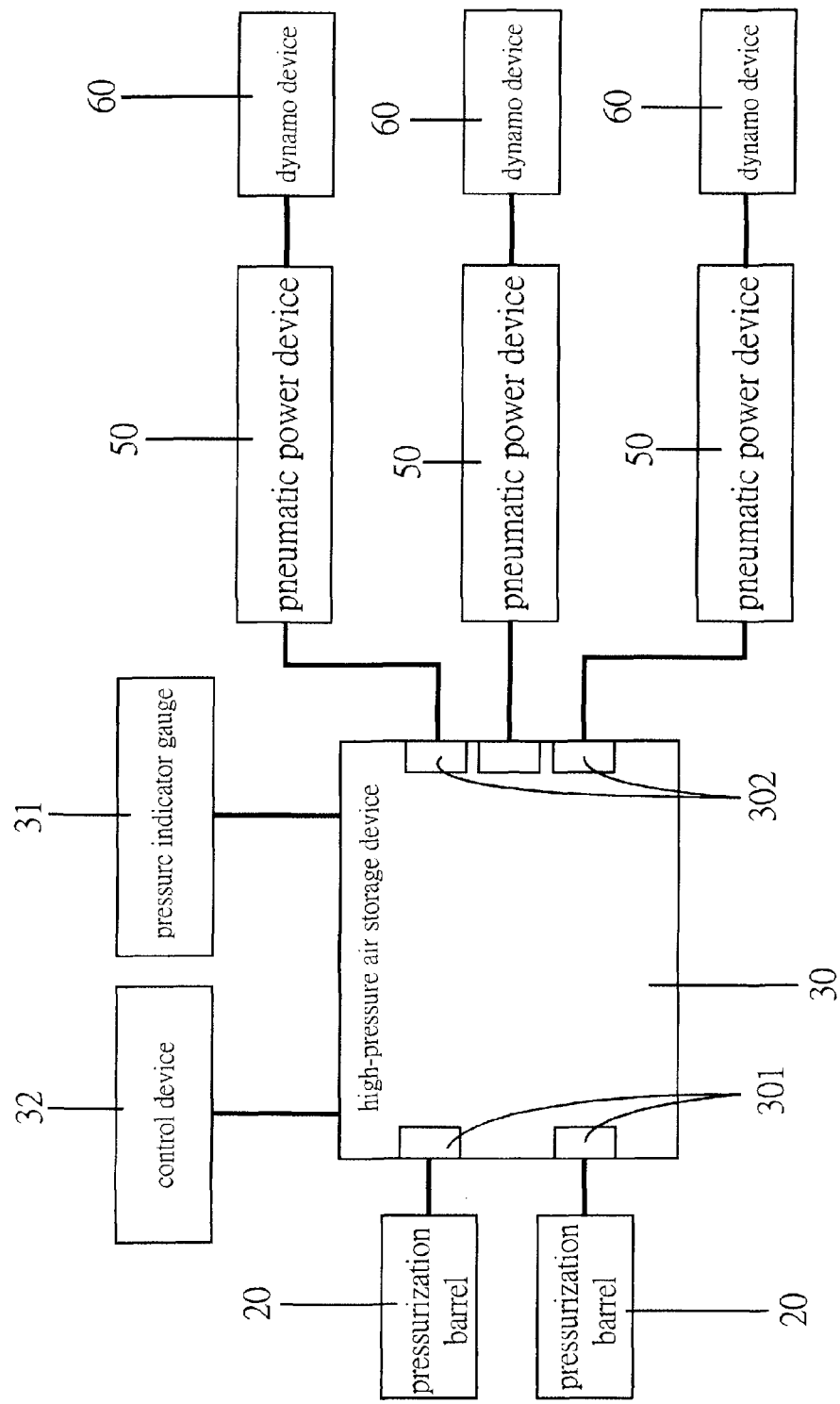
FIG. 9 is a block diagram illustrating a high-pressure air storage device providing supply to pneumatic power devices to activate dynamos according to the present invention.

Referring to FIG. 9, the present invention comprises a high-pressure air storage device 30, wherein an end of the high-pressure air storage device 30 is provided with a control device 32 and a pressure indicator gauge 31; an opposite end of the high-pressure air storage device 30 is connectable to a pneumatic power device 50 so that a user, in an attempt to supply the pressurized air from the high-pressure air storage device 30 to the pneumatic power device 50, may first observe the pressure indicator gauge 31 to get aware of the pressure level of the pressurized air inside the high-pressure air storage device 30 so as to enable control by means of the control device 32 the quantity of pressurized air to each pneumatic power device 50 so that with the pneumatic power device 50 and the dynamo connected, the purpose of supplying pressurized air to activate the dynamo can be achieved to realize an effect of green energy environmental protection and further, the number of the high-pressure air storage device 30 may be more than one to suit the need of a predetermined level of pressure.

Figure 8:
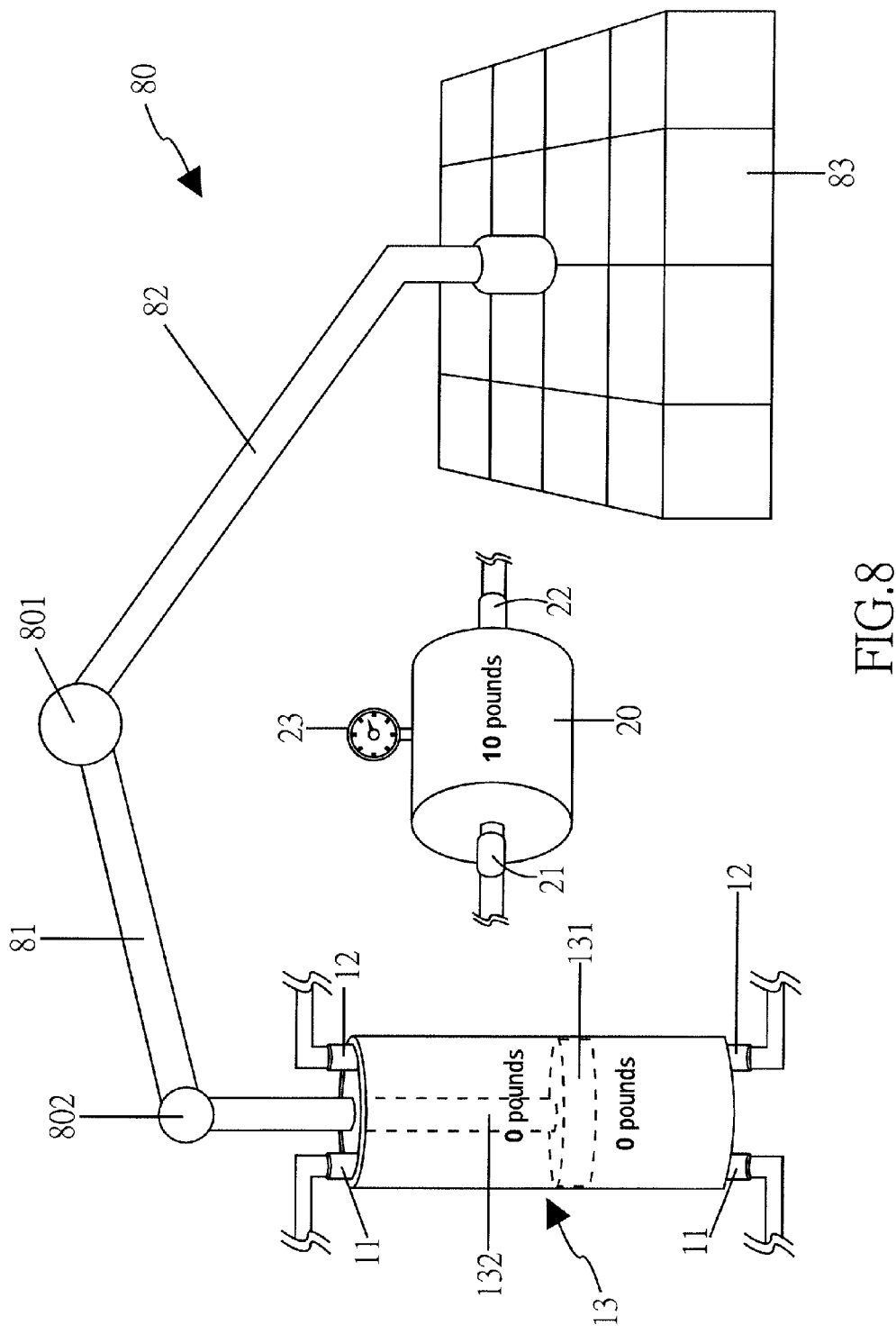
FIG. 8 is a schematic view showing rocker arm based oscillation power generation according to a sixth embodiment of the present invention.
Figure 10:
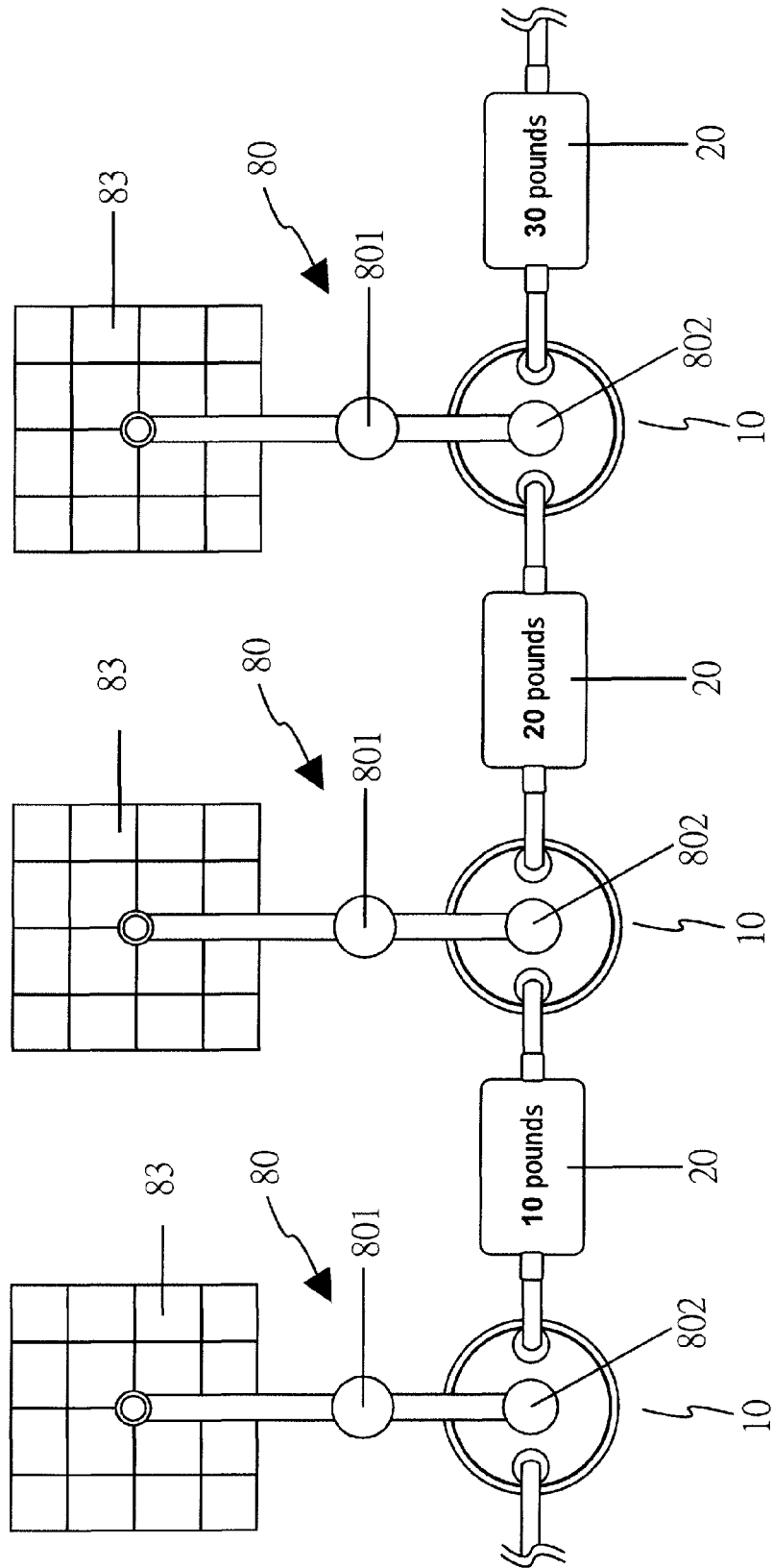
FIG. 10 is a schematic view showing rocker arm based oscillation power generation with more than two groups of energy concentration device according to a seventh embodiment of the present invention.

Referring to FIG. 8, a sixth embodiment of the present invention is shown. The present invention provides an energy concentration device, which uses natural power as power for pressurizing air so as to achieve an effect of air compression and thus achieving concentrated storage of pressurized air energy, which comprises:

a rocker arm based oscillation device 80, wherein the rocker arm based oscillation device 80 comprises a pivotal center 801; an end of the pivotal center 801 is provided with a first bar 81 and an opposite end of the first bar 81 is provided with a universal bearing 802; an opposite end of the pivotal center 801 is provided with a second bar 82 and an opposite end of the second bar 82 is provided with a float device 83;

a plurality of pneumatic cylinders 10, wherein each of the pneumatic cylinders 10 comprises a top 101 and a bottom 102 and each of the pneumatic cylinders 10 comprises a first end 103 and a second end 104; the first end 103 of each of the top 101 and the bottom 102 of each of the pneumatic cylinders 10 is provided with a first one-way valve 11 and the second end 104 of each of the top 101 and the bottom 102 of each of the pneumatic cylinders 10 is provided with a second one-way valve 12; each of the pneumatic cylinders 10 is provided therein with a piston device 13 and the piston device 13 comprises a piston head 131 and a piston rod 132 where an end of the piston rod 132 connected to the piston head 131; the piston head 131 is at a middle of the pneumatic cylinder 10 in an initial condition and an opposite end of the piston head 131 is connected to the first bar 81 of the rocker arm based oscillation device 80; each of the pneumatic cylinders 10 is provided with an air inlet tube 15 and an air outlet tube 16; the first one-way valves 11 of the top 101 and the bottom 102 of each of the pneumatic cylinders 10 are connected to the air inlet tube 15 and each of the air inlet tubes 15 is connected to an external air pumping device; the second one-way valves 12 of the top 101 and the bottom 102 of each of the pneumatic cylinders 10 are connected to the air outlet tube 16;

a plurality of pressurization barrels 20, wherein each of the pressurization barrels 20 comprises a first end 201 and a second end 202 and the first end 201 of each of the pressurization barrels 20 is provided with a first one-way valve 21 and the second end 202 of each of the pressurization barrels 20 is provided with a second one-way valve 22; an end of each of the pressurization barrels 20 is provided with a pressure indicator gauge 23; the first one-way valve 21 of each of the pressurization barrels 20 is connected to the air outlet tube of the second end 104 of each of the pneumatic cylinders 10 and the second one-way valve 22 of each of the pressurization barrels 20 is connected to the air inlet tube 15 of the first end 103 of each of the pneumatic cylinders 10;

a high-pressure air storage device 30, wherein an end of the high-pressure air storage device 30 is provided with at least one first one-way valve 301 and an opposite end of the high-pressure air storage device 30 is provided with a plurality of second one-way valves 302; the first one-way valve 301 of the high-pressure air storage device 30 is connected via a transmission tube to the second one-way valve 22 of the endmost one of the pressurization barrels 20; each of the second one-way valves 302 of the high-pressure air storage device 30 is provided with the external transmission tube and the external transmission tube is connectable with an external pneumatic power device 50; the high-pressure air storage device 30 comprises a pressure indicator gauge 31 and a control device 32 and the control device 32 is operable to control opening/closing of each of the second one-way valves 302;

wherein each of the pneumatic cylinders 10 and each of the pressurization barrels 20 are grouped together as a pressurization system 90; the pressurization systems 90 are connected in a horizontal direction to each other in a serial connection manner, as shown in FIG. 10;

wherein the float device 83 is contactable with waving sea water of the nature to cause the float device 83 of the rocker arm based oscillation device 80 to move up and down so as to have the second bar 82 of the rocker arm based oscillation device 80 drive the first bar 81 to achieve an effect of up and down piston movement of the piston rod 132. Further, with the first bar 81 being provided with a universal bearing 802, an effect of enhancing freedom and flexibility of movement between the first bar 81 and the piston rod 132 is achieved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An energy concentration device, which uses natural power as power for pressurizing air so as to achieve an effect of air compression and thus achieving concentrated storage of pressurized air energy, which comprises:

a plurality of pneumatic cylinders, wherein each of the pneumatic cylinders comprises a top and a bottom and each of the pneumatic cylinders comprises a first end and a second end; the first end of each of the top and the bottom of each of the pneumatic cylinders is provided with a first one-way valve and the second end of each of the top and the bottom of each of the pneumatic cylinders is provided with a second one-way valve; each of the pneumatic cylinders is provided therein with a piston device and the piston device comprises a piston head and a piston rod where an end of the piston rod connected to the piston head; the piston head is at a middle of the pneumatic cylinder in an initial condition and an opposite end of the piston head is provided with a float device; each float device has four corners each of which is provided with a through hole; each of the pneumatic cylinders is provided with an air inlet tube and an air outlet tube; the first one-way valves of the top and the bottom of each of the pneumatic cylinders are connected to the air inlet tube and each of the air inlet tubes is connected to an external air pumping device; the second one-way valves of the top and the bottom of each of the pneumatic cylinders are connected to the air outlet tube; each of the pneumatic cylinders is provided externally with a protection enclosure and the protection enclosure is provided in each of four internal corners thereof with a support post, wherein each of the support posts is received through each of the through holes of the float device;

a plurality of pressurization barrels, wherein each of the pressurization barrels comprises a first end and a second end and the first end of each of the pressurization barrels is provided with a first one-way valve and the second end of each of the pressurization barrels is provided with a second one-way valve; an end of each of the pressurization barrels is provided with a pressure indicator gauge; the first one-way valve of each of the pressurization barrels is connected to the air outlet tube of the second end of each of the pneumatic cylinders and the second one-way valve of each of the pressurization barrels is connected to the air inlet tube of the first end of each of the pneumatic cylinders;

a high-pressure air storage device, wherein an end of the high-pressure air storage device is provided with at least one first one-way valve and an opposite end of the high-pressure air storage device is provided with a plurality of second one-way valves; the first one-way valve of the high-pressure air storage device is connected via a transmission tube to the second one-way valve of the endmost one of the pressurization barrels; each of the second one-way valves of the high-pressure air storage device is provided with the external transmission tube and an external transmission tube is connectable with an external pneumatic power device; the high-pressure air storage device comprises a pressure indicator gauge and a control device and the control device is operable to control opening/closing of each of the second one-way valves;

wherein each of the pneumatic cylinders and each of the pressurization barrels are grouped together as a pressurization system; the pressurization systems are connected in a horizontal direction to each other in a serial connection manner; each of the pneumatic cylinders is provided with a protection enclosure and the protection enclosure is provided in each of four internal corners thereof with a support post with each of the support posts coupled to an inner top end of the protection enclosure; and wherein the float device is contactable with waving sea water of the nature to cause the float device to drive the piston rod to achieve an up-and-down piston movement.

2. The energy concentration device according to claim 1, wherein the first one-way valves are ingress-allowed egress-prohibited one-way check valves and the second one-way valves are egress-allowed ingress-prohibited one-way check valves.

3. An energy concentration device, which uses natural power as power for pressurizing air so as to achieve an effect of air compression and thus achieving concentrated storage of pressurized air energy, which comprises:

a plurality of pneumatic cylinders, wherein each of the pneumatic cylinders comprises a top and a bottom and each of the pneumatic cylinders comprises a first end and a second end; the first end of each of the top and the bottom of each of the pneumatic cylinders is provided with a first one-way valve and the second end of each of the top and the bottom of each of the pneumatic cylinders is provided with a second one-way valve; each of the pneumatic cylinders is provided therein with a piston device and the piston device comprises a piston head and a piston rod where an end of the piston rod connected to the piston head; the piston head is at a middle of the pneumatic cylinder in an initial condition and an opposite end of the piston head is provided with a float device; each float device has four corners each of which is provided with a through hole; each of the pneumatic cylinders is provided with an air inlet tube and an air outlet tube; the first one-way valves of the top and the bottom of each of the pneumatic cylinders are connected to the air inlet tube and each of the air inlet tubes is connected to an external air pumping device; the second one-way valves of the top and the bottom of each of the pneumatic cylinders are connected to the air outlet tube; each of the pneumatic cylinders is provided externally with a protection enclosure, the protection enclosure is provided in each of four internal corners thereof with a support post, each of the support posts is received through each of the through holes of the float device;

a plurality of pressurization barrels, wherein each of the pressurization barrels comprises a first end and a second end and the first end of each of the pressurization barrels is provided with a first one-way valve and the second end of each of the pressurization barrels is provided with a second one-way valve; an end of each of the pressurization barrels is provided with a pressure indicator gauge; the first one-way valve of each of the pressurization barrels is connected to the air outlet tube of the second end of each of the pneumatic cylinders and the second one-way valve of each of the pressurization barrels is connected to the air inlet tube of the first end of each of the pneumatic cylinders;

a high-pressure air storage device, wherein an end of the high-pressure air storage device is provided with at least one first one-way valve and an opposite end of the high-pressure air storage device is provided with a plurality of second one-way valves; the first one-way valve of the high-pressure air storage device is connected via a transmission tube to the second one-way valve of the endmost one of the pressurization barrels; each of the second one-way valves of the high-pressure air storage device is provided with an external transmission tube and the external transmission tube is connectable with an external pneumatic power device; the high-pressure air storage device comprises a pressure indicator gauge and a control device and the control device is operable to control opening/closing of each of the second one-way valves;

wherein each of the pneumatic cylinders and each of the pressurization barrels are grouped together as a pressurization system and each of the pressurization system is coupled through vertical stacking on each other; each of the pneumatic cylinders is provided with a protection enclosure and the protection enclosure is provided in each of four internal corners thereof with a support post with each of the support posts extending through an inner top end of the protection enclosure so that the support posts function as rails along which movements can be made;

wherein the float device is contactable with waving sea water of the nature to cause the float device to drive the piston rod to achieve up-and-down piston movement.

4. The energy concentration device according to claim 3, wherein the first one-way valves are ingress-allowed egress-prohibited one-way check valves and the second one-way valves are egress-allowed ingress-prohibited one-way check valves.

5. An energy concentration device, which uses natural power as power for pressurizing air so as to achieve an effect of air compression and thus achieving concentrated storage of pressurized air energy, which comprises:

a crankcase, wherein the crankcase is provided therein with a crank; the crank is provided, in a spaced manner, with a plurality of connection bars; the crankcase is externally provided with a connection shaft; the connection shaft is coupled to other cranks of the crankcase;

a plurality of pneumatic cylinders, wherein each of the pneumatic cylinders comprises a top and a bottom and each of the pneumatic cylinders comprises a first end and a second end; the first end of each of the top and the bottom of each of the pneumatic cylinders is provided with a first one-way valve and the second end of each of the top and the bottom of each of the pneumatic cylinders is provided with a second one-way valve; each of the pneumatic cylinders is provided therein with a piston device and the piston device comprises a piston head and a piston rod where an end of the piston rod connected to the piston head; the piston head is at a middle of the pneumatic cylinder in an initial condition and an opposite end of the piston head is connected to the connection bar of the crankcase; each of the pneumatic cylinders is provided with an air inlet tube and an air outlet tube; the first one-way valves of the top and the bottom of each of the pneumatic cylinders are connected to the air inlet tube and each of the air inlet tubes is connected to an external air pumping device; the second one-way valves of the top and the bottom of each of the pneumatic cylinders are connected to the air outlet tube;

a plurality of pressurization barrels, wherein each of the pressurization barrels comprises a first end and a second end and the first end of each of the pressurization barrels is provided with a first one-way valve and the second end of each of the pressurization barrels is provided with a second one-way valve; an end of each of the pressurization barrels is provided with a pressure indicator gauge; the first one-way valve of each of the pressurization barrels is connected to the air outlet tube of the second end of each of the pneumatic cylinders and the second one-way valve of each of the pressurization barrels is connected to the air inlet tube of the first end of each of the pneumatic cylinders;

a high-pressure air storage device, wherein an end of the high-pressure air storage device is provided with at least one first one-way valve and an opposite end of the high-pressure air storage device is provided with a plurality of second one-way valves; the first one-way valve of the high-pressure air storage device is connected via a transmission tube to the second one-way valve of the endmost one of the pressurization barrels; each of the second one-way valves of the high-pressure air storage device is provided with the external transmission tube and the external transmission tube is connectable with an external pneumatic power device; the high-pressure air storage device comprises a pressure indicator gauge and a control device and the control device is operable to control opening/closing of each of the second one-way valves;

wherein each of the pneumatic cylinders and each of the pressurization barrels are grouped together as a pressurization system and the pressurization systems are connected to each other in a serial connection manner;

further, the connection shaft of the crankcase is connectable with an external power device for power generation so as to couple to and drive a rotary device arranged in the external power device, whereby the connection shaft drives the crank of the crankcase to rotate and the piston rod of each of the pneumatic cylinders is connected to the connection bar of the crank of the crankcase so that the piston rod can be driven by the connection bar of the crank to achieve an effect of up and down piston movement;

wherein the external power device is a wind power generation device; the wind power generation device comprises blades and a transmission shaft; the wind power generation device comprises a rotor and a dynamo; the rotor is coupled to the transmission shaft; whereby an external airflow, when contacting the blades, drives the transmission shaft to rotate so as to allow the rotor to drive the dynamo to generate electrical power whereby electricity supplied from the dynamo can be used to drive a rotary device to rotate.

6. The energy concentration device according to claim 5, wherein the first one-way valves are ingress-allowed egress-prohibited one-way check valves and the second one-way valves are egress-allowed ingress-prohibited one-way check valves.

7. An energy concentration device, which uses natural power as power for pressurizing air so as to achieve an effect of air compression and thus achieving concentrated storage of pressurized air energy, which comprises:

a rocker arm based oscillation device, wherein the rocker arm based oscillation device comprises a pivotal center; an end of the pivotal center is provided with a first bar and an opposite end of the first bar is provided with a universal bearing; an opposite end of the pivotal center is provided with a second bar and an opposite end of the second bar is provided with a float device;

a plurality of pneumatic cylinders, wherein each of the pneumatic cylinders comprises a top and a bottom and each of the pneumatic cylinders comprises a first end and a second end; the first end of each of the top and the bottom of each of the pneumatic cylinders is provided with a first one-way valve and the second end of each of the top and the bottom of each of the pneumatic cylinders is provided with a second one-way valve; each of the pneumatic cylinders is provided therein with a piston device and the piston device comprises a piston head and a piston rod where an end of the piston rod connected to the piston head; the piston head is at a middle of the pneumatic cylinder in an initial condition and an opposite end of the piston head is connected to the first bar of the rocker arm based oscillation device; each of the pneumatic cylinders is provided with an air inlet tube and an air outlet tube; the first one-way valves of the top and the bottom of each of the pneumatic cylinders are connected to the air inlet tube and each of the air inlet tubes is connected to an external air pumping device; the second one-way valves of the top and the bottom of each of the pneumatic cylinders are connected to the air outlet tube;

a plurality of pressurization barrels, wherein each of the pressurization barrels comprises a first end and a second end and the first end of each of the pressurization barrels is provided with a first one-way valve and the second end of each of the pressurization barrels is provided with a second one-way valve; an end of each of the pressurization barrels is provided with a pressure indicator gauge; the first one-way valve of each of the pressurization barrels is connected to the air outlet tube of the second end of each of the pneumatic cylinders and the second one-way valve of each of the pressurization barrels is connected to the air inlet tube of the first end of each of the pneumatic cylinders;

a high-pressure air storage device, wherein an end of the high-pressure air storage device is provided with at least one first one-way valve and an opposite end of the high-pressure air storage device is provided with a plurality of second one-way valves; the first one-way valve of the high-pressure air storage device is connected via a transmission tube to the second one-way valve of the endmost one of the pressurization barrels; each of the second one-way valves of the high-pressure air storage device is provided with the external transmission tube and the external transmission tube is connectable with an external pneumatic power device; the high-pressure air storage device comprises a pressure indicator gauge and a control device and the control device is operable to control opening/closing of each of the second one-way valves;

wherein each of the pneumatic cylinders and each of the pressurization barrels are grouped together as a pressurization system; the pressurization systems are connected in a horizontal direction to each other in a serial connection manner;

wherein the float device is contactable with waving sea water of the nature to cause the float device of the rocker arm based oscillation device to move up and down so as to have the second bar of the rocker arm based oscillation device drive the first bar to achieve an effect of up and down piston movement of the piston rod, further, with the first bar being provided with a universal bearing, an effect of enhancing freedom and flexibility of movement between the first bar and the piston rod is achieved.

8. The energy concentration device according to claim 7, wherein the first one-way valves are ingress-allowed egress-prohibited one-way check valves and the second one-way valves are egress-allowed ingress-prohibited one-way check valves.

* * * * *